United States Patent Office 2,837,497
Patented June 3, 1958

2,837,497

AMINE CURING AGENT FOR EPOXY RESINS

John Delmonte, Glendale, Calif., assignor to Furane Plastics Incorporated, Los Angeles, Calif., a corporation of California No Drawing. Application September 4, 1956
Serial No. 607,590

8 Claims. (Cl. 260—47)

This invention relates to a new curing agent for epoxy resins, and to a method for preparing the same.

The principal object of the invention is to provide an improved liquid curing agent for epoxy resins. Another object is to provide a curing agent for an epoxy resin which increases the heat resistance of the cured resin over that of the commonly used liquid curing agents. Another object is to provide a curing agent for epoxy resins whose use provides better control of the pot-life epoxy-curing agent mixtures.

I have discovered that tertiary amines such as the commercial isomers of dimethyl amino methyl phenol (DMP–10 and DMP–30 of Rohm & Haas Co.), and tri-dimethyl amino methyl phenol, will react with primary polyamines in various proportions, and that the liquid product of this reaction may be used as curing agents for epoxy resins, with the advantages that the new material is liquid in form, produces cured epoxy resins with higher heat distortion temperatures, and by selecting the proportion of the reactants, provides means for controlling the pot life (particularly short life) of preformed mixtures of epoxy resin and curing agent.

I prefer to use as one reactant for the preparation of my new curing agent one of the aromatic amines such as methylene dianiline, m, o, and p phenylene diamine, or tri-amino tri-phenyl methane. A tertiary amine, such as commercial dimethylamino-methylphenol, is heated with one or more of these aromatic polyamines to temperatures at least 210° F. and upward to the boiling points of the reactants to give a new reaction product which may possibly be the type of compound indicated in the following reaction:

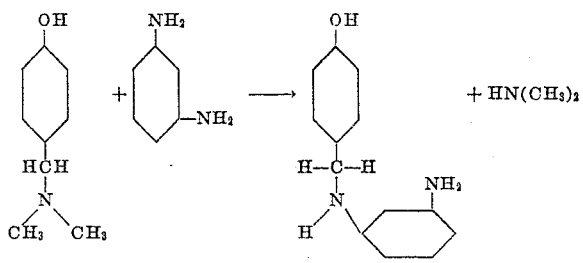

The volatile dimethylamine is removed as a waste gaseous product, or it may be recovered if desired. The reaction product at first is a thin liquid of about 100 centipoises viscosity. As the heating and reaction is continued, the viscosity rises to an upper practical limit of about 25,000 cps. While I have indicated a mono molecular reaction, it is not necessary that the stoichiometric proportions be reacted, as will be apparent from the following examples.

*Example 1*

One part by weight of dimethylamino-methylphenol was heated with an equal weight of meta phenylene diamine. Below about 200° F. a solution was formed, but when this was heated to about 210° F., a gas was evolved and was removed from the liquid mass by vigorous stirring. The resinous product had a viscosity of about 100 centipoises when measured at 80° F.

*Example 2*

A similar product to that of Example 1 was obtained by substituting triamino triphenyl methane for the meta phenylene diamine.

*Example 3*

A similar product to that of Example 1 was obtained by substituting tri-dimethyl amino methyl phenol for the dimethyl amino methyl phenol.

*Example 4*

One part by weight of dimethyl amino methyl phenol was heated with three parts by weight of meta phenylene diamine. The ingredients formed a solution when heated up to about 200° F., but slightly above that temperature a reaction occurred with evolution of a gas, probably dimethylamine. The heating was continued until the reaction was completed, the gas being removed by vigorous stirring at 220° F. The resin formed had a viscosity of 1000 centipoises when measured at 80° F.

*Example 5*

A similar product to that obtained in Example 4 was obtained in the same way by substituting triamino triphenyl methane for the meta phenylene diamine.

*Example 6*

The process described in Example 4 was carried out as described above using one part by weight of dimethyl-amino methyl phenol to 3 parts by weight of a mixture of 60 percent meta phenylene diamine and 40 percent by weight of methylene dianiline. A product having similar properties was formed, with evolution of a gaseous product as above described.

In the above examples, under normal atmospheric pressure, the reactions must be carried out somewhat above 210° F. but not above about 280° F. The optimum temperature is in the range of 230° to 260° F.

The reactions of the above illustrative examples were also carried out at slightly lower temperatures and for shorter times by using reduced pressure to remove the gaseous product of the reaction. It is important that all of the evolved gas be removed in order to get a stable liquid reaction product.

The reaction products of this invention, including those disclosed in the typical examples, are premixed with epoxy resins, and heated to effect hardening and curing of the mixture.

For example, 16 parts by weight of the reaction product of Example 1 were mixed with 100 parts by weight of uncured epoxy resin of the epichlorohydrin-bisphenol A type having an epoxy equivalent range from 0.180 to 0.220. The pot life of this mixture is about 1½ hours. If the reaction product of Example 4 was mixed in the proportions of 16 parts by weight of the reaction product to 100 parts by weight of uncured epoxy resin, the pot life was about 5 hours. In either case the mixture was cured by first heating at 150° F. until the mixture had set, following which stage heating for successive hours at 200°, 300° and 400° F. was employed, and gave the desired complete cure. The cured resins have heat distortion temperatures (measured by A. S. T. M. testing procedure) on the average from 20° to 30° F. above the distortion temperatures attained by other liquid curing agents now in use.

The curing agents of this invention may be used in proportions in the range of 14 to 20 parts by weight to each 100 parts by weight of epoxy resin. Outside this range, the advantages of my new curing agent over other available liquid curing agents are not notable, except that there remains the advantage of using a liquid curing agent which easily blends with the epoxy resin. The higher the proportion of dimethyl amino-methyl phenol used in making the reaction product, the shorter the pot life of the mixture with epoxy resin.

My new liquid curing agent may be equally well employed for curing epoxy resins that have been mixed with heat resistant fillers such as iron oxide, silica and mica, and in these cured mixtures the optimum heat distortion temperature is attained.

The advantages of my invention will be apparent from the description, the use of the reaction product giving a liquid hardener, and one which produces a cured epoxy resin product with higher heat distortion temperatures. It also provides means for regulating the pot life of epoxy resin-hardener mixtures.

I claim:

1. A curing agent for epoxy resins of the polyglycidal ether type comprising the reaction product of a mixture of a primary amine selected from the group consisting of phenylene diamine, methyl dianiline, and triamino triphenyl methane, and a tertiary amine being selected from the group consisting of dimethyl amino methyl phenol and tri-dimethyl amino methyl phenol, said reaction product resulting from heating said mixture to at least 210° F. until all of the evolved gas has been removed.

2. A curing agent for epoxy resins comprising the reaction product of a mixture of dimethyl amino methyl phenol and a primary polyamine selected from the group consisting of phenylene diamine, methyl dianiline and triamino-triphenyl methane, said reaction product resulting from heating said mixture to at least 210° F. until all of the evolved gas has been removed.

3. A curing agent for epoxy resins comprising the reaction product of a mixture of tri-dimethyl amino methyl phenol and a primary polyamine selected from the group consisting of phenylene diamine, methyl dianiline, and triamino-triphenyl methane, said reaction product resulting from heating said mixture to at least 210° F. until all of the evolved gas has been removed.

4. The curing agent defined in claim 2, in which the primary polyamine is triamino triphenyl methane.

5. The curing agent defined in claim 2, in which the primary polyamine is methylene dianiline.

6. The curing agent defined in claim 2, in which the primary polyamine is phenylene diamine.

7. The curing agent defined in claim 3, in which the primary polyamine is phenylene diamine.

8. The curing agent defined in claim 1, in which the weight ratio of the tertiary amine to primary polyamine is in the range of 1:1 to 1:3.

References Cited in the file of this patent

UNITED STATES PATENTS 2,615,919      Biswell _____ Oct. 28, 1952

OTHER REFERENCES

Zonsveld: J. Oil and Colour Chemists Assoc. 37, pages 670–675 (1954).